Figure 1:
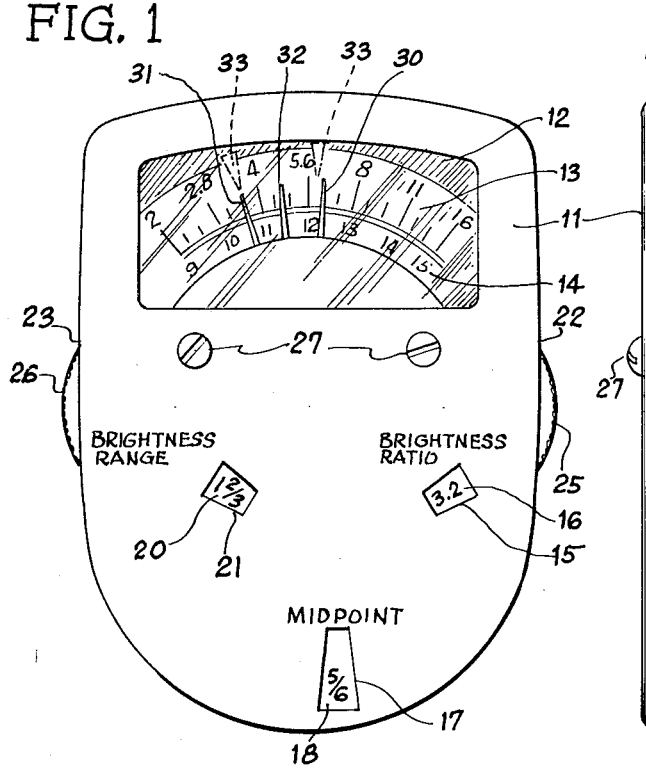

Dec. 18, 1962 G. S. UCHIHARA 3,069,080
BRIGHTNESS RANGE EXPOSURE CALCULATOR
Filed March 12, 1962 2 Sheets-Sheet 1

INVENTOR.
GEORGE S. UCHIHARA
BY Horton, Davis,
Brewer & Brugman
Att'ys

Dec. 18, 1962  G. S. UCHIHARA  3,069,080
BRIGHTNESS RANGE EXPOSURE CALCULATOR
Filed March 12, 1962  2 Sheets-Sheet 2

INVENTOR.
GEORGE S. UCHIHARA
BY Horton, Davis,
Brewer & Brugman
Att'ys

United States Patent Office 3,069,080
Patented Dec. 18, 1962

3,069,080
BRIGHTNESS RANGE EXPOSURE CALCULATOR
George S. Uchihara, Chicago, Ill. (731 Palani Ave., Honolulu 16, Hawaii)
Filed Mar. 12, 1962, Ser. No. 179,005
3 Claims. (Cl. 235—64.7)

This invention relates to a device for calculating the correct exposure for photographic film by relating various light intensities, either incident or reflected, based on measurements obtained by an exposure meter.

Some of the most vexing problems confronting photograpers are the mathematical calculations that are required in order to arrive at the correct exposure setting from the indicated exposure meter readings. An incident light meter measurement of the main illumination indicates the intensity of the light falling upon the scene, but it does not indicate the reflectance ability of each object or area in the scene. A reflected light meter measurement taken from the camera position indicates the average light intensity reflected by the entire scene within the field of view, but it does not indicate separately the intensity of the light reflected by each individual object or specific area in the scene. However, the photographic film registers individually the light reflected by each object or area rather than the average light reflected by the entire scene. Since the reflectance of each object or area varies, no single camera setting can be correct for all objects or areas; therefore, some intermediate setting is required which will yield the best negative or transparency.

The average light intensity read by the reflected light meter is inadequate in several respects: The average reading may indicate an exposure far from the exposure required for the brightest object in the scene in which detail is desired or it may indicate an exposure far from the exposure required for the darkest object in which detail is desired, so that either the bright values may be overexposed or the dark values may be underexposed in the resultant photograph. The average intensity reading also does not indicate whether or not the exposure limitations of the film are being exceeded by the scope of light intensities from the scene, or what the relative values of the bright objects and the dark objects may be so that they may be adjusted or compensated for if necessary.

By way of example, in portrait photography, it is desirable to create depth and character in the subject by front lighting and side lighting which produce highlights and shadows on the subject's face. The relative intensity of reflected light from the subject must be balanced to avoid what are known as burned-out highlights or shadows where details are obscured, or both. The relative intensity of the brightest portion of the subject must not too greatly exceed the intensity of the dimmest portion of the subject, and even when the brightest and dimmest portions of the subject are adequate for the film, the correct setting of the camera must be made in order to avoid overemphasizing either portion.

To obtain the correct exposure setting of a camera, certain facts must be obtained by measurement and by observation and these facts must be interpreted both mathematically and artistically. As indicated above, the facts of interest include the intensity of the brightest reflected light from the scene, the intensity of the dimmest reflected light from the scene, the average intensity of light, the camera setting that is exactly intermediate the settings appropriate for the brightest and dimmest intensities, the exposure limits of the film and others. Artistically, the photographer must analyze the scene based on sound principles of composition and design so that the resultant photograph will express properly what he is trying to communicate.

The photographer may determine the average intensity of light by simply reading an exposure meter that is roughly the same distance from the scene as the camera. The photographer may determine the brightest value and the darkest value of the scene by using his exposure meter locally, that is a few inches away from the brightest area of the scene in which detail is desired and the darkest area of the scene in which detail is desired. When such measurements are made, it is then necessary to calculate the brightness range or the subject contrast in the scene. However, these calculations are difficult because camera settings relating to exposures are an exponential function. For example, on an F-stop scale, the midpoint between F/4 and F/8 is F/5.6, whereas arithmetic interpolation would indicate the midpoint at F/6. Obviously, when the indicated camera settings are between even F-stops, such calculations are difficult and time consuming because ordinary interpolation is not adequate on an exponential scale. Besides the difficulty of such calculations, the time consumed in making them tires both the the photographer and the subject and causes the best pictures to be missed.

It is therefore an object of this invention to provide a calculator which may be set at indicated measureable or observable conditions and when so set will calculate and indicate useful relationships between the various measurable or observable conditions.

It is another object of this invention to provide a calculator having adjusting means which, when manipulated, will simultaneously operate pointers to indicate existing conditions and a calculator to evaluate those conditions whereby the usual calculations required of a photographer may be simply read from the calculator.

It is another object of this invention to combine an exposure meter with a brightness range exposure calculator whereby the conditions prevailing may be introduced into the calculator simply by superimposing a position indicated by the exposure meter by a movable element of the calculator whereby the computations are obtained without even the need for ascertaining the absolute value of prevailing conditions.

These and other objects are accomplished by the device of this invention which comprises two separate but mechanically interrelated mechanical systems which are simultaneously operated by manual manipulation of adjusting means. For convenience, these systems will be termed the data input system and the calculator system, although both provide some calculation and are related by having parts in common.

The data input system comprises a scale of lens apertures calibrated in F-stops, and exposure value scale or other exposure setting systems. Three pointers superimpose the scale or are otherwise positioned to be read in conjunction with it. These pointers are terminals of links in the input system and they may be moved across the scale by manipulating the adjusting means. One pointer is for indicating the highest light intensity in which detail from the scene is desired, one is for indicating the lowest light intensity in which detail from the scene is desired, and the third, as will be hereinafter described always indicates the midpoint between the high intensity pointer and the low intensity pointer.

The high and low intensity pointers are operated by mechanical systems that are symmetrical, that is they are mirror images of one another. Each comprises an adjusting means that may be manually manipulated such as a wheel, circular segment or a lever. The adjusting means has a mechanical link pivoted to some portion that is linearly movable whereby turning the wheel produces linear motion of the pivot and a resultant motion of the link. The pointer is connected to a fixed common pivot at some point between its ends and the link from the adjusting means is pivotally connected to the pointer so that manipulation of the adjusting means causes the pointer to pivot around the common pivot and thereby causes the pointer terminal to move across the exposure setting scale. This pivot is a common pivot for all three of the pointers.

At some medial point on each of the high and low exposure pointers, links of identical length are pivoted and the other ends of the links are pivotally interconnected to each other in a slot in the bisecting pointer that is elongated along its axis. This arrangement permits independent movement of either the high or low pointers, but whenever the high pointer, the low pointer, or both simultaneously are moved, the midpoint pointer will always occupy a position exactly intermediate the two.

Operation of the adjustment means also places the calculating portion into operation. The calculating portion includes for each adjusting means a gear train or equivalent mechanical linkage that causes movement of a dial porportionate to the movement of the adjusting means. The gear trains for each adjusting means are also symmetrical and if moved to cause motion of the high and low intensity pointers in the same direction, they tend to cause motion of the dial to the same extent, but in opposite directions which therefore results in the motion of one canceling the motion of the other, and no motion of the dial is produced. This relationship of the motion of the dial to the motion of the pointers causes the dial to be in a unique position for each specific angle between the high and low pointers regardless of the absolute position of the pointers on the scale. Therefore, the dial calibration indicates the angle between the pointers and as such, it may be calibrated to show the relationship between the high and low intensity values indicated on the scale by the pointers without regard to what those absolute values are. Thus the dial can be calibrated to read in terms of the ratio of high brightness to low brightness, the range of brightness intensities in F-stops, the distance in F-stops that the midpoint is from either the maximum or minimum exposure reading and others.

The accompanying drawings illustrate a presently preferred embodiment of this invention, and they are intended to be merely illustrative of the invention rather than limiting on its scope.

Figure 2:
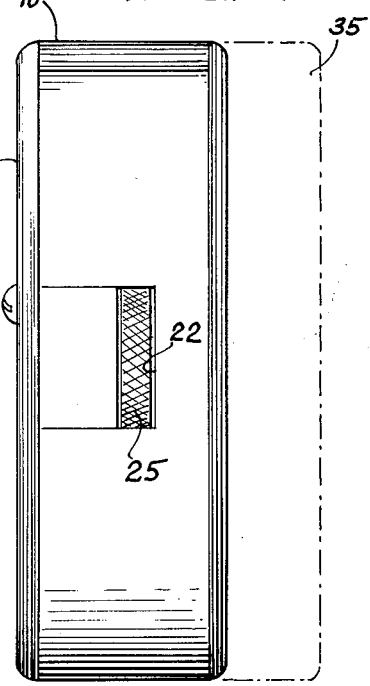
Figure 4:
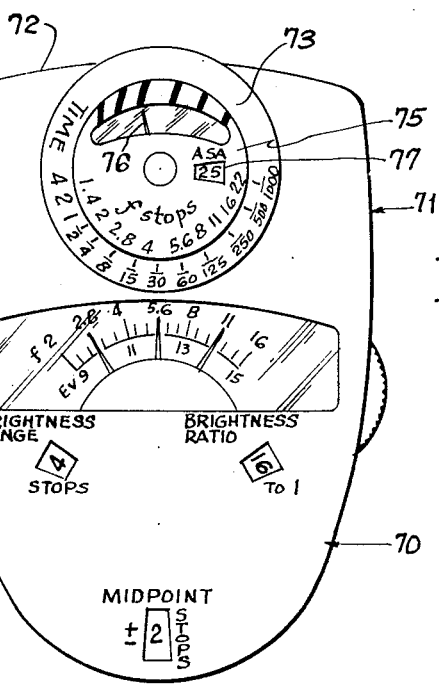
Figure 3:
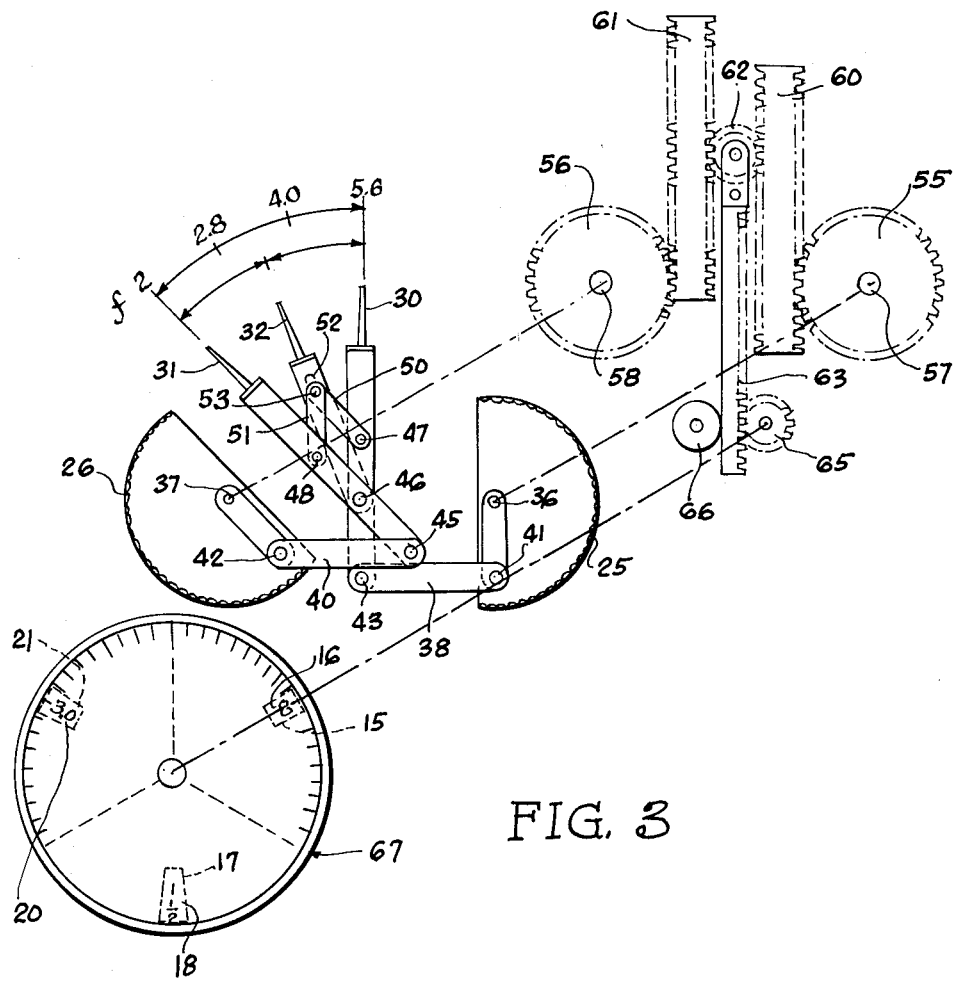

FIG. 1 illustrates a front elevation view of a completely assembled calculator embodying this invention;

FIG. 2 illustrates a side elevation of the embodiment illustrated in FIG. 1, showing in phantom a coupled exposure meter when such additional element is employed, FIG. 3 is an exploded perspective view of the mechanical portions of the calculator which are normally compactly contained within a case as shown in FIG. 1, and FIG. 4 is a front elevation of a calculator embodying this invention which is used in conjunction with a physically connected exposure meter.

Preferably, the calculator of this invention is enclosed in a case 10 and a cover 11. The cover contains openings at appropriate positions so that appropriate portions of the internal mechanical elements may be visible. A large opening 12 in the cover superimposes exposure setting scales 13 and 14 shown herein as being calibrated both in F-stops and in the exposure value scale. Additionally, an opening 15 superimposes a brightness ratio scale 16 which is shown herein as a scale relating the brightest value to the dimmest value, taking the dimmest value as unity. The cover also contains an opening 17 which superimposes a midpoint locating scale 18 for indicating to the user the number of F-stops that the midpoint is from either the brightest or the dimmest values measured. The cover also contains an opening 20 that superimposes a scale 21 for indicating the range, in F-stops, between the brightest and the dimmest indicated portion of the scene.

The case 10 has openings 22 and 23 in opposite sides through which adjusting wheels 25 and 26, respectively, protrude. Screws 27 are employed to hold the cover in place.

The scales 13 and 14 are employed in conjunction with pointers which are shown here superimposing them. The pointers include a high value pointer 30, a low value pointer 31 and a midpoint pointer 32. The pointers conveniently are of different colors such as the high value pointer 30 being yellow to indicate intense light, the low value pointer 31 being black or dark blue to indicate dim light and the midpoint pointer being red, green, etc. to indicate intermediate light intensity. Although only the tapered terminal portions of the pointers are used to indicate positions on the scales 13 and 14, the entire integral length of these elements will be referred to as pointers.

Also in FIG. 1, shown in phantom, is an exposure meter pointer 33 which is illustrated herein in two positions which it might occupy in measuring the intensity of light from a scene, although only one such pointer is employed. The portion 35 shown in phantom in FIG. 2 is an addition to case 10 which contains a conventional light meter mechanism for operating the hand 33 in conjunction with the exposure setting scales 13 and 14. The pointer 33 used in conjunction with the calculator of this invention is optional.

As depicted in FIG. 3, the mechanical portions of the computer of this invention may be generally divided into a data input portion and a computing portion. The data input portion includes adjusting wheels 25 and 26 which are shown in FIG. 3 as wheel segments although complete wheels or other mechanical equivalents may be employed. Each of the adjusting wheels 25 and 26 is pivoted on a central axis 36 and 37, respectively, and each has a connecting link 38 and 40, respectively, that is pivoted eccentrically on wheels 25 and 26 at pivots 41 and 42, respectively. The connecting links are attached pivotally at points 43 and 45, respectively, to the lower portions of pointers 30 and 31, respectively. A common pivot 46 interconnects medial portions of pointers 30 and 31 and the terminal portion of pointer 32, and pivot 46, which is stationary, operates as the center of rotation for all three pointers. Intermediately spaced pivots 47 and 48 connect bisecting links 50 and 51 to an intermediate portion of pointers 30 and 31 and the links 50 and 51 are connected to each other by a pivot 53 in an axially extended slot 52 in the midportion of pointer 32.

The data input portion of this device acts as follows. Manipulation of adjusting wheel 25, for example, causes pivot 41 to rotate in a curvilinear manner around the pivot point 36 thereby causing link 38 to move, which in turn moves pivot 43. The motion of pivot 43 causes pointer 30 to pivot around the common pivot 46 which causes the other end of the pointer to move across the scales 13 and 14. Motion of pointer 30 also causes pivot 47 to move which changes the relative angle that bisecter links 50 and 51 make with each other. However, since these links are of equal length, this angle will always be bisected by the axis of pointer 32, and the pivot 53 which interconnects links 50 and 51 will ride up or down in the slot 52 to accommodate the motion of those links. The pointer 32 will move in the same direction as the pointer 30 but only half the distance so that it will continue to indicate exactly the midpoint between pointers 30 and 31. The same analysis may be made of the motion of the symmetrical linkage including adjusting wheel 26, connecting link 40 and pointer 31 and it may also be indicated that the position of pointer 32 will occupy the midpoint between pointers 30 and 31 whether one or both of the pointers 30 and 31 are moved and regardless of the direction in which they are moved.

In the embodiment illustrated in FIG. 3, the interconnection between the data input portion of the computer and the computing portion is the construction that permits concurrent motion of adjusting wheel 25 and gear 55 and the concurrent motion of adjusting wheel 26 and gear 56. This concurrent motion may be obtained by rigidly interconnecting the wheels and their respective gears to rotate on the same axis, or even by mechanically forming the gear as part of the adjusting wheel. It is also within the scope of this invention to employ the gear per se as the adjusting wheel and to affix an eccentric pivot such as pivots 41 and 42 to a portion of the gear. Regardless of what means is employed, any motion of an adjusting wheel should produce a simultaneous and equal or proportionate motion in its associated gear. Gears 55 and 56 rotate on fixed axes 57 and 58 respectively and are engaged to drive double-sided gear racks 60 and 61, respectively. The symmetrical arrangement of gears 55 and 56 causes a clockwise motion of the gear 55 to raise rack 60 and a counterclockwise motion of the gear 56 to raise gear rack 61 and vice versa. A floating gear 62 is engaged between racks 60 and 61 at diametrically opposed portions of gear 62. Gear 62 has no fixed axis and it moves up and down, driven by racks 60 and 61. Any movement of rack 60 or 61 will cause movement of gear 62 in the same direction but of only half the distance. Gear 62 has a rack 63 connected to it by being pivoted to its axis so that any motion of the gear 62 causes axial motion of the rack 63 of the same distance and in the same direction. The rack 63 is held engaged to a gear 65 by an idler 66 whereby the up and down motion of the rack 63 causes the gear 65 to rotate. The dial 67, which contains the hereinbefore mentioned scales 16, 18 and 21, which each occupy a segment of the dial slightly less than 120 degrees, is fixed to rotate in the same direction and to the same or a proportionate extent as gear 65, and in this embodiment, the dial 67 may be rigidly connected to the gear 65 and on the same center of rotation so that the two elements 65 and 67 mechanically act as one piece.

The operation of the computing portion of this device will be described with relation to specific elements shown, although these are not intended as limitations of the invention. When the exposure setting scales occupy a 90 degree arc and when the minimum range between pointers 30 and 31 occupies a 15 degree arc, for example, one full F-stop, the maximum throw of either pointer 30 or 31, or their adjusting elements 25 or 26, is 75 degrees. As shown herein, the maximum spread between pointers 30 and 31 is between F/2 and F/16 which is a spread of 90 degrees, but the maximum exposure value to which pointer 31 may point is F/11 while the minimum exposure value to which pointer 30 may point is F/2.8. As hereinbefore explained, regardless of what position pointers 30 and 31 occupy, pointer 32 will indicate the exact midpoint between them.

If adjusting wheels 25 and 26 have a maximum throw of 75 degrees, gears 55 and 56 also are limited to a maximum rotation of 75 degrees. The gear ratio between gears 55 and 56 as activating gears and gear 65 as an activated gear is 3:1 so that, if directly connected, one revolution of gear 55 would produce three revolutions of gear 65. However, the motion produced in gear 65 results from operation of rack 60 or 61 which in turn moves gear 62 and rack 63 which ultimately moves gear 65. As heretofore explained, motion of either rack 60 or 61 in any direction produces motion in rack 63 in the same direction but only half the distance, and any rotation of gear 55 or 56 produces one half of that amount of rotation in gear 65. Therefore, the 3:1 gear ratio is divided in half by the action of racks 60 or 61 on the gear 62. Thus, the ultimate gear ratio is 3:1 divided by two, or 1.5:1, and in moving pointers 30 or 31 across the full scale, that is through 75 degrees, a rotation of 112.5 degrees in gear 65 is produced, and dial 67 which is directly coupled to gear 65 will also move through 112.5 degrees. Since each one-third of dial 67 occupies 120 degrees, three scales can comfortably fit around its periphery as shown leaving 120 minus 112.5 or 12.5 degrees available to prevent overlapping so that indicia from one scale will not appear in the windows associated with an adjacent scale. The windows 15, 17 and 20 are shown in FIG. 3 in phantom illustrating how they superimpose a given portion of each scale occupying a segment of the periphery of dial 67.

From the foregoing description it may be seen that any counterclockwise movement of the adjusting wheel 26 will cause the gear 62 to rise and the pointer 31 to move toward the left hand side of the exposure setting scales. If this occurs the gear 65 turns clockwise causing different numbers on the dial to appear beneath the windows. As a result of movement of one pointer, a different angle between pointers 30 and 31 exists and different indicia are read on the computer portion of the device. If the adjusting wheel 25 is then turned counterclockwise, it will cause the gear 62 to descend turning the dial counterclockwise toward the position it previously occupied. Counterclockwise motion of the adjusting wheel 25 causes the dial 67 to move in the opposite direction and to the same extent that it moved when adjusting wheel 26 was turned counterclockwise. Thus, if pointers 30 and 31 were moved across scales 13 and 14 simultaneously in the same direction and at the same rate, the dial 67 would not turn at all. This illustrates that whenever a specific angle is formed between pointers 30 and 31, a unique set of indicia will appear in windows 15, 17 and 20 regardless of what portion of the scale the pointers occupy or the absolute value of the exposure settings they indicate.

As illustrated in FIG. 3, pointer 30 indicates a high exposure setting of F/5.6 while pointer 31 indicates a low exposure setting of F/2 and pointer 32 indicates the midpoint between these settings. At these settings, the window 15 which is herein illustrated as indicating the brightness ratio as related to unity shows that the brightness ratio is 8, which indicates that the exposure requiring a camera setting at F/5.6 is eight times as intense as an exposure requiring a camera setting of F/2. In the window 17, which indicates the number of F-stops that the midpoint is from either maximum or the minimum exposure setting, the number 1½ is seen. This indicates that the midpoint is one and one-half F-stops lower than the maximum setting and one and one-half F-stops higher than the minimum setting. In window 20, the number 3.0 is seen and this window indicates the brightness range between maximum and minimum as read in F-stops. At the settings involved, it is obvious that there are three even F-stops between F/2 and F/5.6; however, if the pointers were at intermediate F-stop positions, this quantity would not be so apparent.

When a light meter 35 is coupled with the computer, the pointer 33, which indicates light intensity, may operate on the same exposure setting scale as the pointers 30, 31 and 32. When this embodiment of the invention is employed, the pointer 30 may be adjusted simply to superimpose the maximum position of pointer 33 when it is indicating maximum brightness and the minimum position of pointer 33 when it is indicating minimum brightness whereby all of the calculations of the computer may be made and the midpoint setting may be found without even determining the absolute value of the maximum and minimum positions, but simply by the manipulation of the adjusting wheels 25 and 26 to set pointers 30 and 31 at positions corresponding to those determined by the exposure meter.

To further illustrate the utility of this invention, the readings on the dials in FIG. 1 will be described. In FIG. 1 neither the maximum nor the minimum readings are in even F-stops, the maximum brightness indicated by pointer 30 being one-third of the linear distance between F/5.6 and F/8, while the minimum brightness is indicated by pointer 31 as being two-thirds of the distance between F/2.8 and F/4. In this position, it would require a difficult calculation to determine the ratio between maximum and minimum brightness. However, simply reading the indicia appearing in window 15 indicates that the brightness ratio is 3.2. Window 17 indicates that the midpoint in F-stops is five-sixths of an F-stop from either the maximum or the minimum point and window 20 indicates that the brightness range is one and two-thirds F-stops.

From the foregoing, it is evident that the brightness range exposure calculator of this invention provides a tool for the photographer which eliminates completely the necessity of calculating factors involving the range of brightness or exposure settings of the scene or subject being photographed. All of the laborious and difficult calculations involving arithmetical and exponential functions may be eliminated by simply adjusting pointers to reproduce positions indicated by an exposure meter on the scale of the calculator with simple finger manipulations of adjusting elements such as wheels 25 and 26. When these positions are reproduced, the combined action of the various mechanical systems within the computer instantly provide the answers in convenient units that would have required laborious calculations to obtain by conventional methods. The calculator of this invention is not so complex as to require elaborate mechanism and it may be readily constructed as a neat, compact device having a major dimension of about three to four inches or less and shaped to fit into the palm of the hand. The calculator may be operated with one hand as when held in the palm of one hand so that the adjusting wheel 25 may be operated with the thumb while the adjusting wheel 26 may be operated with the index or middle finger of the same hand. The elements required to be observed in the operation of the calculator are simple in that the maximum brightness pointer, besides being colored to indicate brightness, cannot cross the minimum brightness pointer when the linkage described in employed. Misoperation or confusion by the user is therefore virtually impossible.

FIG. 4 illustrates a convenient modification of this invention. In FIG. 4, the numeral 70 indicates a calculator such as described hereinabove, which is fitted with a connecting means such as an accessory clip or foot, which is not shown, to physically couple an exposure meter 71 to the calculator 70. The exposure meter 71 is of conventional form having light gathering cells 72 in one side which actuate an indicating needle 76. The indicating needle 76 is disposed within sliding scale 73 bearing a linear scale of shutter speeds that are related to sliding scale 75 which bears a scale of F-stop aperture settings. Scale 75 is rotated until a number indicating film speed appears in window 77 thereby orienting the scales 73 and 75 with respect to needle 76 in the conventional way. In the embodiment shown in FIG. 4, the exposure meter 71 and the calculator 70 are conveniently held as a single unit and the scale of one is physically positioned near the scale of the other to facilitate reading exposure meter 71 and setting calculator 70.

Although the calculator of this invention has been described only with respect to the calculations that are read directly, it is quite versatile and may be used for many other calculations by the experienced photographer. By way of example only, this device may be employed to convert filter factor, brightness ratio or lighting ratio into terms of number of F-stops and vice versa. If a filter having a factor of 5 is employed, a photographer may set pointer 31 at F/2 and move pointer 30 until the number "5" appears in the brightness ratio window 15. The converted answer (2+⅓ F-stops) can then be read directly in window 20.

The photographer may wish to increase his general exposure by "n" times. To do this he may set pointer 30 on the basic exposure setting he is using and move pointer 31 until "n," the number of times he wishes his exposure increased, appears in the brightness ratio window 15. The proper camera setting to effectuate this increased exposure will then be indicated by the position of pointer 31 on the exposure setting scales 13 and 14.

This device can also be employed to obtain the values for incident light as well as for reflected light and in many other ways to emphasize light or dark values when special photographic effects are required that would not be produced by the "correct" camera settings.

The photographer may also wish to increase his exposure by "n" number of F-stops. To do this he may set pointer 30 on the exposure setting scales 13 and 14 as indicated by the exposure meter reading and move pointer 31 until the desired number of F-stop increase appears in window 17. The proper camera setting to effectuate this increased exposure will then be indicated by the position of midpoint pointer 32 on either scale 13 or 14. Of course, decreasing the basic exposure by "n" number of F-stops would be accomplished by corresponding movements of opposite pointers.

I claim:
1. A brightness range exposure calculator comprising:
   (a) an exposure setting scale,
   (b) a high value pointer,
   (c) a low value pointer,
   (d) a midpoint pointer,
   (e) a common pivot interconnecting said high, low and midpoint pointers at a position such that all are positioned to be read in conjunction with said exposure setting scale,
   (f) a high value adjusting means,
   (g) a low value adjusting means,
   (h) first means connecting said high value pointer to a linearly movable portion of said high value adjusting means whereby motion of said high value adjusting means causes said high value pointer to pivot around said common pivot and move across said exposure setting scale,
   (i) second means connecting said low value pointer to a portion of said low value adjusting means that symmetrically corresponds to the position that said high value pointer is connected to said high value adjusting means,
   (j) bisecter links of equal operative length one each pivotally connected to corresponding portions of each of said high value and low value pointers, said links being pivotally interconnected in an axially elongated opening in said midpoint pointer,
   (k) means operated by said first adjusting means to move a first gear rack axially a distance substantially proportional to the distance that said adjusting means is moved and symmetrical means operated by said second adjusting means to move a second gear rack in the same respect,
   (l) a floating gear engaged at diametrically opposed points between said first and second gear racks,
   (m) a third gear rack movable axially by said floating gear,
   (n) a second gear engaged to be moved by said third gear rack and connected to rotate an indicator dial,
   (o) indicia on said indicator dial calibrated to indicate a relationship of the brightnesses indicated on said scale by said high value and low value pointers,
   (p) a cover over said dial having openings positioned to superimpose
      (1) said exposure setting scale, and
      (2) a portion of said dial that contains indicia indicating the angular relationship between said high value and said low value pointers in terms of relationship on the exposure setting scale.

2. The calculator of claim 1 further characterized in that a measured-exposure pointer is positioned to be read in conjunction with said scale, said measured-exposure pointer being actuated by a conventional exposure meter.

3. The calculator of claim 1 further characterized in that said high value adjusting means and said low value adjusting means comprise rotating elements, at least a portion of which are circular.

4. The calculator of claim 3 further characterized in that said means operated by said adjusting means comprise gears connected rigidly to said adjusting means to rotate on the same axis.

5. The calculator of claim 1 further characterized in that said means operated by said adjusting means traverses a maximum of 75 degrees, and said means operated by said adjusting means and said indicator dial have an operating movement ratio of 1.5:1, and said indicator dial contains three peripheral scales each occupying a segment of said dial not exceeding 120 degrees.

6. The calculator of claim 1 further characterized in that said cover contains an opening superimposing a scale calibrated and positioned to have a number representing the ratio of the light intensities of the brightest value indicated by the high value pointer to the lowest value indicated by the low value pointer visible through said opening.

7. The calculator of claim 1 further characterized in that said cover contains an opening superimposing a scale calibrated and positioned to have a number representing the difference, in F-stops, between the exposure settings indicated by said high value pointer and said low value pointer visible through said opening.

8. The calculator of claim 1 further characterized in that said cover contains an opening superimposing a scale calibrated and positioned to have a number representing the difference, in F-stops, from the position of either of said high value pointer and low value pointer to the midpoint between the latter two pointers visible through said opening.

References Cited in the file of this patent

UNITED STATES PATENTS

| | | |
|---|---|---|
| 2,258,635 | Uffrecht | Oct. 14, 1941 |
| 2,422,316 | Simon | June 17, 1947 |